United States Patent [19]

Burke et al.

[11] 4,075,403

[45] Feb. 21, 1978

[54] PHENOLIC RESIN AND BATTERY SEPARATOR IMPREGNATED THEREWITH

[75] Inventors: William D. Burke, West Springfield; Harold P. Higginbottom; John R. Le Blanc, both of Wilbraham, all of Mass.

[73] Assignee: Monsanto Company, St. Louis, Mo.

[21] Appl. No.: 760,873

[22] Filed: Jan. 21, 1977

Related U.S. Application Data

[62] Division of Ser. No. 691,276, June 1, 1976.

[51] Int. Cl.$^2$ .............................................. H01M 2/16
[52] U.S. Cl. .................................................... 429/253
[58] Field of Search ........................... 429/253; 428/361

[56] References Cited

U.S. PATENT DOCUMENTS

| | | | |
|---|---|---|---|
| 2,543,137 | 2/1951 | Uber | 429/253 |
| 2,591,754 | 4/1952 | Wilson et al. | 429/253 |
| 2,662,106 | 12/1953 | Uhlig et al. | 429/253 |
| 2,678,961 | 5/1954 | Uhlig et al. | 429/253 |
| 2,850,559 | 9/1958 | Stickel | 429/253 |
| 3,382,213 | 5/1968 | Nelson et al. | 429/253 |
| 3,475,355 | 10/1969 | Decker | 429/253 |
| 3,703,494 | 11/1972 | Anderson et al. | 429/253 |
| 3,893,871 | 7/1975 | Jones | 429/253 |
| 3,926,679 | 12/1975 | Jones | 429/253 |

Primary Examiner—J.C. Cannon
Attorney, Agent, or Firm—Joseph S. Nelson; William J. Farrington; James C. Logomasini

[57] ABSTRACT

The invention relates to an improved phenol-aldehyde resole resin composition for battery separators and a fibrous battery separator impregnated with the composition. Said composition comprising a resole resin with particular soluble hydroxy organic salts that do not salt out and improve the oxidation resistance of the battery separators.

7 Claims, No Drawings

PHENOLIC RESIN AND BATTERY SEPARATOR IMPREGNATED THEREWITH

This is a division of application Ser. No. 691,276, filed June 1, 1976.

BACKGROUND OF THE INVENTION

This invention relates to an improved composition of a phenol-aldehyde resin containing a particular type of salt and to the cellulosic fibrous battery separator impregnated with the composition.

Permeable cellulosic fibrous battery separators are used extensively in batteries of either the conventional wet lead-acid type or the so-called "dry charge" lead-acid type. It is necessary that the fibrous structures thereof be protected from attack by the acid employed in the batteries. Therefore, when cellulosic fibrous battery separators are employed, they consist of cellulosic sheets impregnated with a phenol-aldehyde type of resin, which, when advanced to the infusible state, protects the fibers of the cellulosic sheet from attack by the acid.

The phenolic resin employed in battery separators are usually water base resole liquid resins or solvent-containing "varnishes". In order to produce satisfactory battery separator properties the resins are generally supplied in a pH range of about 7.0–8.0, which is accomplished by neutralizing most of the basic catalyst employed in forming the resin. According to the acid employed for neutralization, either an insoluble salt or a soluble salt may be present.

The insoluble salt is removed by filtration, while the soluble salt is left in the resin. In the latter case, the choice of relatively inexpensive acids is quite limited. Thus, hydrochloric acid cannot be used because chloride has a deleterious effect on batteries. Acetic acid is volatile and may come off during cure of the separator, causing the pH to rise and thus producing a dark, brittle separator.

Sulfuric acid is used and the commonly formed salt is sodium sulfate, since the resole is often catalyzed with sodium hydroxide. While this salt is generally water soluble in the resole, it will precipitate out as the decahydrate if the resin solids are too high, or if the temperature of the resin becomes too low. Resin solids level can be adjusted to prevent precipitation due to that factor, but precipitation due to low temperature is a cold weather problem and generally happens in storage tanks of the battery separator producer. Since there are usually no facilities for heating such tank, the resin may become unsatisfactory for use due to the precipitate.

Thus, it would be beneficial to neutralize with an acid having none of the above problems. A class of hydroxy organic acids were found to be beneficial. The hydroxy acids are selected from the group consisting of citric, tartaric and lactic or mixtures thereof. Not only does it eliminate the salting out problem, but, surprisingly the separators made from the resin containing polyacid salts had improved oxidation resistance, an important property, over a similar base resin containing sodium sulfate salt.

SUMMARY OF THE INVENTION

The present invention relates to an improved resole resin composition for battery separators comprising:

A. a resole resin formed as the reaction product of about 1.0 to 3.0 mols of formaldehyde per mol of phenol in the presence of an alkaline catalyst, the improvement comprising having present:

B. an alkaline hydroxy organic acid salt formed by neutralizing said resole resin with sufficient hydroxy organic acid to provide said resole resin with a pH of 7 to 9.

The present invention also relates to an improved cellulosic fibrous permeable battery separator impregnated with a resole resin composition comprising:

A. a resole resin formed as a reaction product of about 1.0 to 3.0 mols of formaldehyde per mol of phenol in the presence of an alkaline catalyst, the improvement comprising having present:

B. an alkaline hydroxy organic acid salt formed by neutralizing said resole resin with sufficient hydroxy organic acid to provide said resin with a pH of 7 to 9.

Any phenol-aldehyde resin may be employed in the practice of this invention. Particularly useful, however, are the phenol-formaldehyde resins which are generally prepared by the reaction of about 1.0–3.0 mols of formaldehyde per mol of phenol in the presence of appropriate catalysts. The phenolformaldehyde resins may be either a one-stage resin recovered in water, a one-stage resin recovered in a water-organic solvent. The preparation of these resins is generally well-known and the type of phenol-formaldehyde resin obtained depends upon the ratio of formaldehyde to phenol and the catalyst chosen for the reaction. As is well known in the art, the catalyst employed in the reaction is basic in nature. The preferred phenol-aldehyde resin to be employed in the practice of this invention is a phenol-formaldehyde resin prepared by reacting 1.0–3.0 mols of formaldehyde per mol of phenol in the presence of an alkaline catalyst and wherein the reaction product is recovered in water. The phenol-formaldehyde resin employed in the practice of this invention should also have a water tolerance of 0.1 volume of water per equal volume of resin to greater than 50 volumes of water per volume of resin. However, as a practical limit, the water tolerance should be 1 to 4 volumes of water per one volume of resin or a water dilutability of 100 to 400 percent.

After the formation of the resole resin under alkaline conditions at from 60° to 100° C. using 0.03 to 1.00 mols of alkaline catalysts, e.g. sodium hydroxide or potassium hydroxide per 100 parts of phenol to a free formaldehyde end point of 1 to 4 percent, the resole is generally diluted to a solids content of 40 to 60 percent by weight with a solvent such as water or alcohol or mixtures thereof and neutralized with a hydroxy organic acid to a pH of from about 7 to 9. The hydroxy organic acids found to give the resin unexpectedly high salt stability with no salt precipitation at low storage temperatures were the acids of the group consisting of citric, tartaric and lactic or mixtures thereof. The acids produced sodium or potassium salts that do not salt-out or precipitate out in the resole when stored at low temperatures, e.g. at about 3.0° C.

This invention is also directed to a cellulosic fibrous permeable battery separator consisting of a permeable cellulosic fibrous sheet impregnated with the resin composition of this invention and wherein the phenol-aldehyde resin is advanced to the infusible state. The cellulosic fibrous sheet is treated with the composition of this invention by either the wet-web saturation method or the dry-web method. In either method, it may be desirable to dilute the resin composition in order to obtain the desired pickup. The treated cellulosic sheet is dried to remove excess solvent and is then subjected to a temperature of about 150° C. to about 300° C. in order to advance the phenol-aldehyde resin to an infusible state. The time of exposure of the treated cellulosic fibrous sheet to these temperatures will vary from approximately 30 minutes at 150° C. to at least one minute at 300° C. In addition, the cellulosic fibrous battery separator is generally ribbed to increase its resistance to degradation during use thereof in a lead-acid battery. Generally, it is also desirable to impregnate the cellulosic fibrous sheet with about 20–50 weight percent of the resin composition of this invention.

EXAMPLE 1

An unneutralized resole resin was prepared by reacting 100 parts phenol with 120 parts 50 percent formalin at 77° C. with 0.06 mols NaOH to a free formaldehyde end point of 1.8 percent. The resin was diluted to about 47 percent solids with a mixture of 50 percent water and 50 percent methanol.

The resin was divided into two portions, one being neutralized to a pH of 7.7 with sulfuric acid (I) and one to 7.85 (IV) with citric acid. Portions of these two resins were then blended 1:1 (II) and 1 part sulfuric acid neutralized: 3 parts citric acid neutralized (III).

The four resins were refrigerated at 3° C. and observed for salt precipitation. After about 24 hours, a heavy precipitate was noted in I, with progressively lesser amounts in II and III and there was no precipitate in IV.

EXAMPLE 2

The resins were checked for oxidation resistance, a key property in battery separators. Cotton linters paper of 20 mils thickness was passed through a bath of each resin diluted to about 25 percent solids. The paper was then passed through squeeze rolls and dried 30 minutes at 180° C. to cure the resin. This gave a cured resin content of approximately 25 percent.

The papers were then tested for oxidation resistance by boiling 3 hours in a solution of sulfuric acid and potassium dichromate, after which they were washed, dried and weighed to obtain the loss in weight from the origianl value. This weight loss is expressed as the oxidation resistance. The values obtained were:

| Resin | Percent weight loss |
|-------|---------------------|
| I     | 57.3                |
| II    | 42.7                |
| III   | 39.2                |
| IV    | 37.2                |

Thus, the surprising superiority of citric acid over sulfuric acid is demonstrated, not only in the salt precipitation problem, but also in oxidation resistance.

It was also found that the presence of the citrate salt has no deleterious effect on the wetting or rewetting characteristics of the separators.

The use of citric acid for neutralization applies to any typical battery separator resin, i.e., resole resins generally having a formaldehyde/phenol mol ratio of about 1.0–3.0/1 usually catalyzed by alkali metal bases, such as sodium or potassium, in the range of 0.03–1.00 mols per mol of phenol charged. Depending upon the actual level of basic catalyst used, the citric acid quantity should be such as to bring the final resin pH into the range of about 7–8 preferably.

The example given here is not meant to limit the acid used to citric. Other hydroxy organic acids such as lactic, tartaric, etc. gave similar results.

What is claimed is:

1. An improved cellulosic fibrous permeable battery separator impregnated with a resole resin composition comprising:
    A. a resole resin formed as a reaction product of about 1.0 to 3.0 mols of formaldehyde per mol of phenol in the presence of an alkaline catalyst, the improvement comprising having present:
    B. an alkaline hydroxy organic acid salt formed by neutralizing said resole resin with sufficient hydroxy organic acid to provide said resin with a pH of 7 to 9.

2. A battery separator of claim 1 wherein said hydroxy organic acid is citric, tartaric, lactic or mixtures thereof.

3. A battery separator of claim 1, wherein said alkaline catalyst is sodium hydroxide, potassium hydroxide or mixtures thereof.

4. A battery separator of claim 1, wherein said salt is sodium citrate, sodium tartrate, sodium lactate, potassium citrate, potassium tartrate, potassium lactate or mixtures thereof.

5. A battery separator of claim 1, wherein said resole resin has been advanced to a free formaldehyde end point of from about 1 to 4 percent and is water soluble, having a water dilutability of from 100 to 400 percent.

6. A battery separator of claim 1, wherein said resole resin is a solution having from about 40 to 60 percent resin solids by weight and contained in a solvent selected from the group consisting of water and alcohol or mixtures thereof.

7. A battery separator of claim 1, wherein said resin composition comprises about 20–50 percent by weight of the separator.

* * * * *